US006928364B2

(12) United States Patent
Tsuyuki

(10) Patent No.: US 6,928,364 B2
(45) Date of Patent: Aug. 9, 2005

(54) NAVIGATION APPARATUS AND METHOD

(76) Inventor: Toshio Tsuyuki, 865-1-3-352, Kajiya, Yugawaracho, Ashigarashimo-gun, Kanagawa, 259-0313 (JP)

( * ) Notice: Subject to any disclaimer, the term of this patent is extended or adjusted under 35 U.S.C. 154(b) by 0 days.

(21) Appl. No.: 10/292,485

(22) Filed: Nov. 13, 2002

(65) Prior Publication Data

US 2003/0069687 A1 Apr. 10, 2003

Related U.S. Application Data

(63) Continuation of application No. 09/646,416, filed as application No. PCT/JP99/01344 on Mar. 18, 1999, now abandoned.

(30) Foreign Application Priority Data

Mar. 18, 1998 (JP) .......................................... 10-110023

(51) Int. Cl.⁷ ............................................. G01C 21/26
(52) U.S. Cl. ...................... 701/200; 701/201; 701/209; 701/211; 701/25; 340/990; 340/995.19
(58) Field of Search ............................. 701/23–25, 201, 701/212, 200, 207, 208, 209, 210, 211; 340/995.1, 995.14, 995.19, 995.21, 995.18, 988, 990, 995; 73/178 R

(56) References Cited

U.S. PATENT DOCUMENTS

| | | | | |
|---|---|---|---|---|
| 5,204,817 A | | 4/1993 | Yoshida | 701/210 |
| 5,412,573 A | | 5/1995 | Barnea et al. | 340/990 |
| 5,467,276 A | * | 11/1995 | Tsuyuki | 701/207 |
| 5,675,492 A | | 10/1997 | Tsuyuki | 701/210 |
| 5,906,654 A | * | 5/1999 | Sato | 701/210 |
| 6,038,510 A | * | 3/2000 | Lee | 701/213 |
| 6,052,645 A | * | 4/2000 | Harada | 701/212 |
| 6,061,629 A | * | 5/2000 | Yano et al. | 701/209 |
| 6,067,499 A | | 5/2000 | Yagyu et al. | 701/201 |
| 6,101,443 A | | 8/2000 | Kato et al. | 701/210 |
| 6,292,745 B1 | * | 9/2001 | Robare et al. | 701/208 |
| 6,374,182 B2 | * | 4/2002 | Bechtolsheim et al. | 701/209 |

FOREIGN PATENT DOCUMENTS

| | | |
|---|---|---|
| JP | A-55-33695 | 3/1980 |
| JP | A-01202615 | 8/1989 |
| JP | A-02151715 | 6/1990 |
| JP | A-04335390 | 11/1992 |
| JP | A-05002365 | 1/1993 |
| JP | A-05094131 | 4/1993 |
| JP | A-06035401 | 2/1994 |
| JP | A-06251296 | 9/1994 |
| JP | A-08233595 | 9/1996 |
| JP | A-08285632 | 11/1996 |
| JP | A-09106402 | 4/1997 |
| JP | 09243394 A | 9/1997 |
| JP | A-09281211 | 10/1997 |
| JP | A-09305104 | 11/1997 |

* cited by examiner

Primary Examiner—Jacques H. Louis-Jacques
(74) Attorney, Agent, or Firm—Oliff & Berridge, PLC

(57) ABSTRACT

A navigation apparatus, and method, comprised of an input unit, central processing unit, output unit, locator, processing devices, computing and retrieving devices, and storage unit. The navigation apparatus and method computes or retrieves and outputs or displays a unit area not suitable for travel, that is, a "cell", from a destination, based on, for example, a type of moving object or data of a navigated area. The navigation apparatus and method thereby presents cells as realistic, useful, basic information based on various travel factors and enables such cells to be avoided and the destination to be reached.

68 Claims, 6 Drawing Sheets

NAVIGATION APPARATUS AND METHOD

TECHNICAL FIELD

The present invention relates to a navigation apparatus and method used for a moving object.

BACKGROUND ART

In the related art, the information provided to a user by a navigation system when the navigated area is land has been the current position or course displayed in a map, instructions at intersections, and three-dimensional images, illustrations, etc. for giving greater visual interest. That is, systems have been developed in a direction away from the inherently required utility, safety, and quick response.

Navigation systems have been worked on for over 20 years in Japan, the U.S., and Europe as national development programs. The Japanese system, which is map based, however, requires for example the driver to read a map when using the system and therefore draws attention away from the road. This system is therefore being banned or restricted in Europe and the U.S. as being undesirable for traffic safety.

On the other hand, in the American and European guidance system, which provides instructions on the course by arrows or voice, has a high potential for causing accidents due to mistaken instructions. To reduce the rate of occurrence of accidents due to such misguidance, guidance is suspended on main roads. Therefore, the function inherently sought in such a system, that is, reaching a destination in a pinpoint manner, has to be foregone.

Current products are simply being used without these problems in the map system and guidance system being solved. They are therefore being marketed simply as novelties. Television programs, the newspapers and other mass media frequently carry reports about the dangers of use of these products claiming that there are problems in their safety.

Inherently, however, navigation is a key technology for realizing a road traffic system for eliminating congestion and controlling traffic. Further, it is a technology which cries for incorporation into mobile information devices—one side of the spectrum of information terminals, now polarizing between stationary units and mobile units—currently playing a central role as carriers of multimedia information in the midsts of society's information revolution, and should become a basic technology of the system.

The part of the conventional technology relating to hardware has already reached a considerable level of accuracy and sufficient practicality, but the software has not yet reached a practical level. Numerous problems remain.

In particular, when the navigated area is the city streets, utility, safety, quick response, and other factors become essential and have to be improved in order for navigation to be offered as a key technology in road traffic systems and multimedia systems.

Utility means duly reaching the destination when a destination is set. Safety means eliminating the problem of the extreme risk in traffic safety posed by drawing attention away from the road or misguidance. Quick response means incorporating sufficient dynamic information on accidents, congestion, the weather, etc. to smooth the flow of traffic. If these can be achieved, then navigation systems can play the role they were meant for.

This is the main object to be solved by the present invention.

A navigation system tailored to the specific type of the moving object, mission, and skill when the navigated area is the land, sea, or air is also necessary.

DISCLOSURE OF THE INVENTION

Problems remain to be solved in the area of the software systems. Improvement of the software, however, is impossible without a fundamental change in the conventional thinking.

According to the conventional thinking, a navigation system naturally has to have a position-fixing function for indicating where one is and a guidance function for indicating how to get somewhere. These functions have been considered to equal navigation functions.

The current position is for example converted to information using various means of expression for strict reference against map information such as background information. Two-dimensional images are not longer enough—three-dimensional images are now being provided. Sophisticated switching of images, realistic expressions of the foreground as if seen by the driver through the windshield, detailed maps of a 25 meter scale, and other diverse means of, expression have now become the norm. All this, however, merely provides psychological satisfaction and visual stimulation to the driver. It is of little practical use and in fact ends up increasing the danger.

Even with the guidance function, it is considered necessary to provide instructions by voice alone so as not to distract the driver from the road. This, however, places great stress on both the system and the driver.

The reason why development in Japan and the West has become so disorganized is that it is constrained by the conventional thinking in the art. This is because what a navigation system is and what it should be have never been fundamentally analyzed.

Further, this is because the information used for the systems and forming their underlying assumptions has never itself been analyzed.

Users of systems want to check their current positions against the background information—one type of information on the navigated area—merely because of an old-fashioned psychological need of travelers to check where they are during their journeys.

In particular, for travel on city streets, how to get somewhere is a final function and an ideal which should be foresworn at a stage where the systems are incomplete and the infrastructure has not been fully laid. Even if examined conceptually, the function should be considered unrealistic in view of the need for maintenance of data, accuracy of positioning, the psychology of drivers in traffic, the complexity and diversity of traffic conditions, etc.

To solve the problem of such misuse of navigation systems, it is necessary to provide useful information which the traveler realistically needs, without being mired in the position-fixing function or guidance function of indicating where one is or how to get somewhere, and to analyze, select, and process information relating to the travel based on this.

The present invention solves this problem by presenting the traveler with such analyzed, selected, and processed information.

It is necessary to provide basic information to ensure the above utility, safety, and quick response in the system for cases where the moving object is a pedestrian, motorcycle, ordinary size vehicle, large size vehicle, aircraft, ship, etc.

By providing such useful basic information first, various existing additional information can also be put to effective use.

According to the present invention, a unit of an unsuitable area classified based on suitability as determined by the type of tile moving object linked with other factors relating to travel is computed or retrieved and output or displayed as a "cell".

Cells are shown to show the state of the navigated area. Further, the area around a current position, the area around a destination, a navigated area including the current position and destination, cells having correlation, common cells where cells obtained relating to the current position and destination overlap, highlighting of the same, display of a blanks contiguous to a cell as an attribute of the cell, cells overlaying a line connecting the current position and destination, cells contiguous with a course, cells relating to various types of information such as the track, heading, vector of the moving body, and destination direction, etc. may be output and displayed.

Further, consumer information, business information, leisure information, and general map information may be selectively added for specific purposes. Depending on the type of the moving object, status, locale, and the mode of use, the information may be output and displayed on a display of a mobile phone or may be presented inside a vehicle on the instrument panel, a special monitor, the windshield, etc.

If the mobile phone is set at a predetermined location, output and display from there to an instrument panel, monitor, windshield, etc. also become possible. Output and display to an electronic memo book are also possible.

The storage unit may be an IC card or CD or may be a communications system transmitting information. Positioning may be achieved by a global positioning system, beacons, or ground stations, may be input by the user, may be obtained by sensors, etc.

When used for an aircraft or ship, vectors and cells are used as information.

The navigated area may be divided into the land, sea, and air. A passable area is defined as a "blank". A unit area not suitable for travel and surrounded by blanks is output and displayed as a cell.

When the navigated area is the land, the cells are computed or retrieved and output and displayed by the type of the moving body and by the state of the land.

Cells may be computed or retrieved based on the type of moving body such as a pedestrian, ordinary size vehicle, large size vehicle, etc. and the distance between the current position and destination, accidents, congestion, restrictions, and other conditions.

Cells of the land, cells around the current position, cells near the current position, the cell in which the current position falls, blanks surrounding these cells, cells contiguous with these blanks, and other cells relating to the current position and similarly cells relating to the destination such as cells around the destination, cells near the destination, the cell in which the destination falls, blanks surrounding these cells, cells contiguous with these blanks, etc. may be output and displayed.

Further, when a cell relating to the current position and a cell relating to the destination match, this is output or displayed highlighted by sound or an image as a "common cell".

Further, cells on a line segment connecting the current position and destination, cells contiguous with blanks comprising the course from the current position to the destination, etc. maybe output and displayed. These are defined as types of cells relating to the destination. Common cells with cells relating to the current position may be found and output or displayed highlighted.

The above cells and blanks may be output or displayed as basic information, while dynamic information on congestion, accidents, the weather, etc. may be output or displayed as additional information.

Since the cells and blanks are simple as basic information, the extra space can be made good use of. Background information, one type of map information, landmarks, business information, consumer information, tourist information, leisure information, etc. may also provided.

In the conventional map system, this additional information had been provided without choice. Compared with this, according to the present invention, additional information may be selectively used for specific purposes.

Further, similarly, in the conventional guidance system, stress had been given to both the system and user. Compared with this, the present invention provides various types of information in a stress-free manner.

When the navigated area is the sea, the cells and blanks may be output or displayed, a vector showing the speed and direction of the moving object and an ideal vector enabling cells to be avoided output or displayed, and the direction and speed determined by the user so as to make the ideal vector and the vector of the moving body match.

When the navigated area is the air, the cells, the vector of the moving object, and the ideal vector may be computed and output and displayed three-dimensionally based on the wind currents and other factors.

BEST MODE FOR WORKING THE INVENTION

Next, embodiments of the present invention will be explained with reference to the attached drawings.

Figure 1:
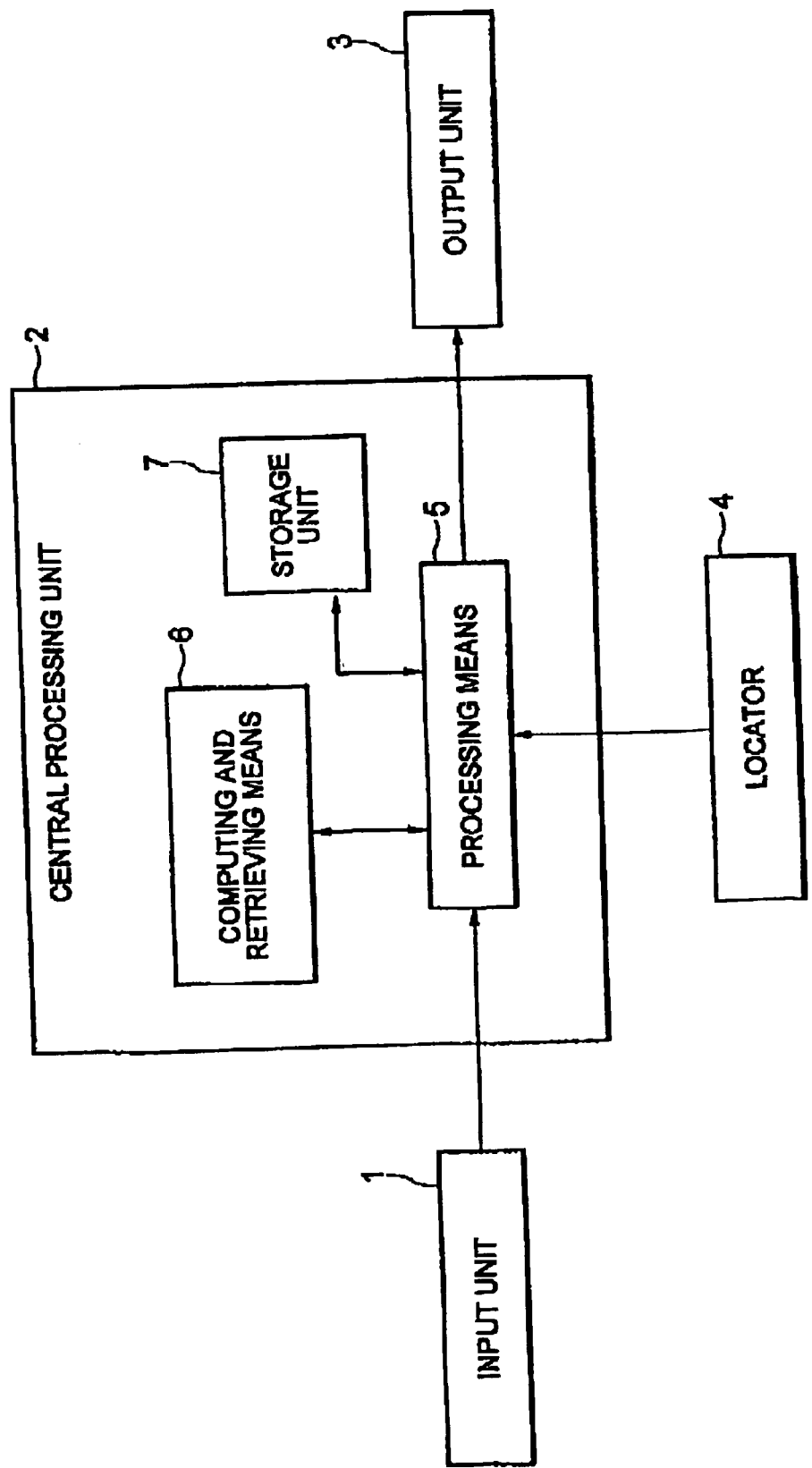
FIG. 1 is a view of the configuration of an embodiment according to the present invention.

In FIG. 1, 1 is an input unit, 2 a central processing unit, 3 an output unit, and 4 a locator for fixing the position or a moving body.

The navigation apparatus according to the present embodiment is used mainly for a pedestrian or automobile, but also for an aircraft, ship, etc.

The input unit 1 is for inputting various instructions or data through keys, a touch panel, voice, etc.

The central processing unit 2 is comprised of a computer and includes a processing means 5, a computing and retrieving means 6, and a storage unit 7.

The storage unit 7 stores programs and data for computation and retrieval for working the present embodiment.

A wired or wireless communications means may be used for the input as well. It is also possible to store transmitted programs and data by this means.

The processing means 5 has processing functions realized by the programs and data stored in the storage unit 7.

The computing and retrieving means 6 has the function of searching through the data of the storage unit 7 to find the necessary data based on an instruction from the processing means 5.

The output unit 3 outputs or displays information by sound or image.

The unit is comprised of a cathode ray tube (CRT), liquid crystal display, heads up display (HUD) for display on glass etc., a speaker, etc. and is provided on a cart, in an automobile, on a mobile phone, electronic memo book, a panel near the captain's or pilot's seat in an aircraft or ship, etc.

The locator 4 has the function of fixing the current position of the moving body.

The locator 4 includes various sensors for measuring the distance and bearing, satellite signal locators, locators for locating by beacons placed at the road side for emitting information relating to the position and transmitting ground stations, means for fixing the position based on information relating to the position input by the user by voice, keys, or a touch panel, etc. The locator may also be comprised of a combination of these position fixing means.

Figure 2:
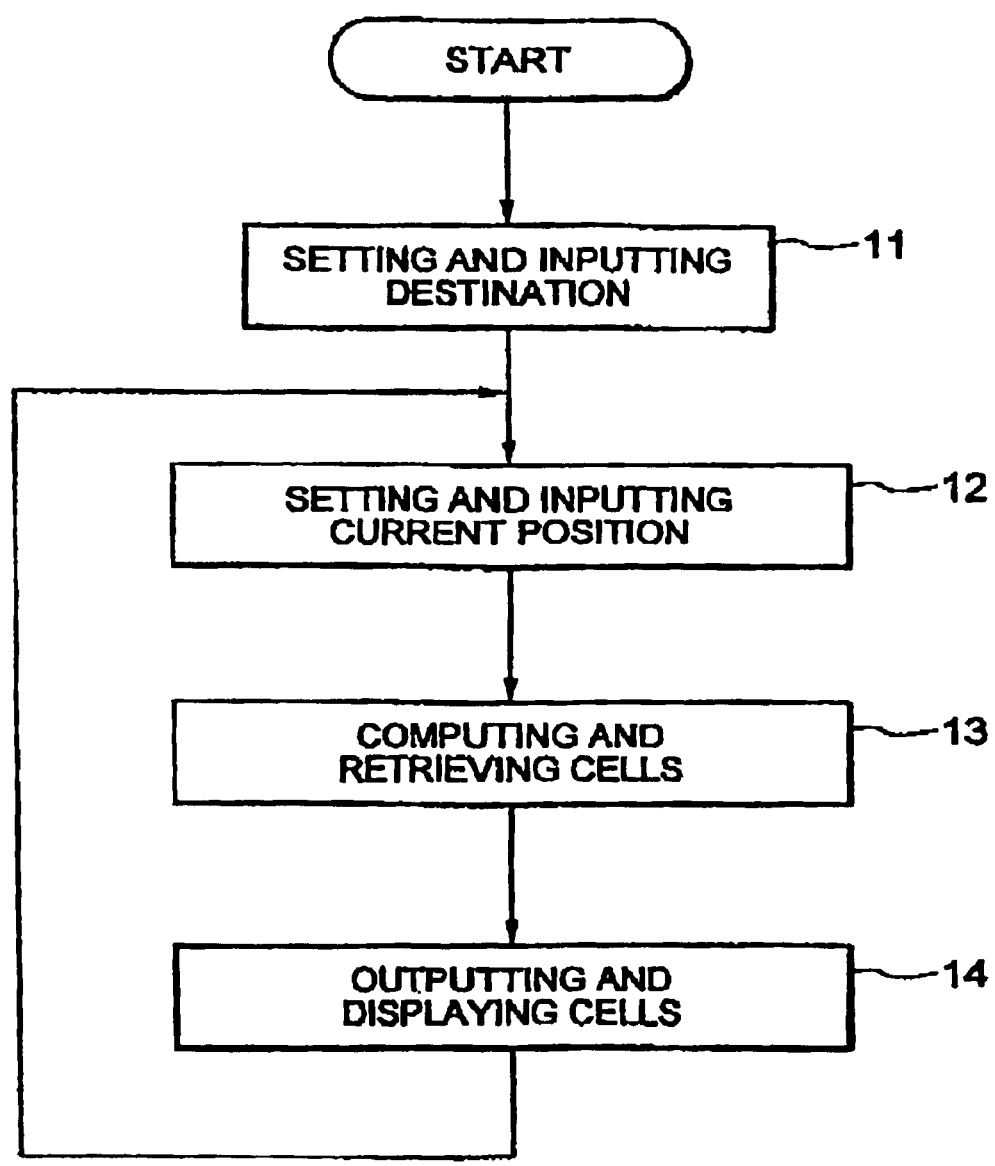
FIG. 2 is a flow chart of the embodiment.

Next, an explanation will be made of the operation realized by the above configuration with reference to FIG. 2.

The navigation apparatus is operated by the various functions realized by the processing means 5 and the computing and retrieving means 6.

First, a destination is set by the input unit 1 and input to the central processing unit 2 (step 11).

The destination may be input by any method.

The name of the destination, telephone number, address, code name, code number, symbol, various identification means, longitude and latitude, post office number, nearby landmarks, and other information relating to the destination may be input by keys, a touch panel, cursor, voice, bar code reader, or any other device or means.

Next, the current position is input to the central processing unit 2 by the input unit 1 and the locator 4 (step 12).

The user may input the information relating to the current position by a similar method as with input of the information relating to the destination.

As examples of the information relating to the current position, there are nearby landmarks, facilities, the address, code name, code number, symbol, positional coordinates, name of the road and intersection, etc.

As the locator, use may be made of one using positioning signals sent from a satellite, one using detection by distance sensors, bearing sensors, and acceleration sensors, ones using beacons placed at the road side, signals from transmitters, sound waves, and lasers, ones using positioning with a transmitting ground station in the region, ones using a bar code or magnetic signal placed on the road surface, etc.

The central processing unit 5 holds the information relating to the destination and current position input by the processing means 5.

The processing means 5 next finds the positional data based on data of the destination and current position.

Next, it operates the computing and retrieving means 6 to find by computation or retrieval from the data stored in the storage unit 7 the blanks, cells, contiguous cells, common cells, etc. based on the various data stored in the storage unit 7 and the data relating to the destination and current position (step 13).

At step 14, the data relating to the cells found by the computing and retrieving means 6 is held in the processing means 5 and supplied from the processing means 5 to the output means 3. At this time, various additional information may also be sent from the processing means 5 to the output unit 3.

The output unit 3 has a sound or image output and display function of outputting or displaying required sounds or images.

Therefore, the various data and information sent to the output unit 3 are converted to a format enabling output and display by sound or image.

The cells etc. and the various types of additional information sent to the output unit 2 in this way are output and displayed at step 14.

FIG. 3 to FIG. 9 show examples of display on the screen of the output unit 3.

FIG. 3 to FIG. 9 show examples where images, among sounds and images output and displayed from the output unit 3, are displayed by the output unit 3.

Figure 3:
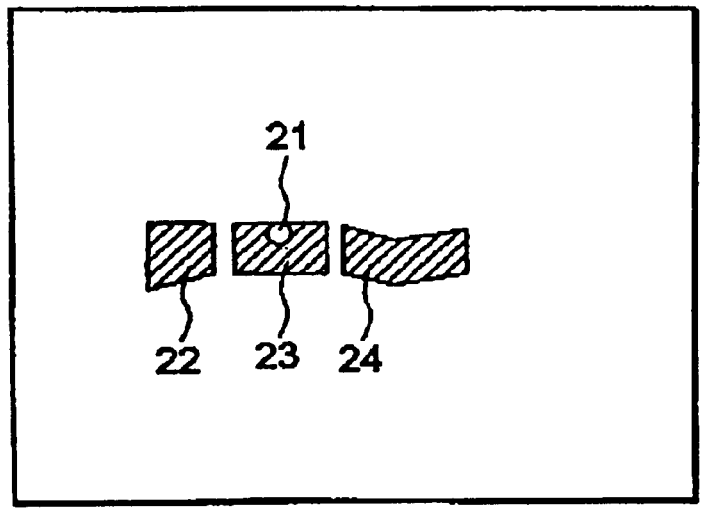
FIG. 3 to FIG. 9 are views of examples of display.

In FIG. 3, 21 is a destination to be reached, and 22, 23, and 24 are cells. A cell 23 in which the destination falls and cells 22 and 24, among the cells contiguous with the blank closest to the destination, in the same row as the cell in which the destination falls and at the same side area are displayed.

Figure 4:
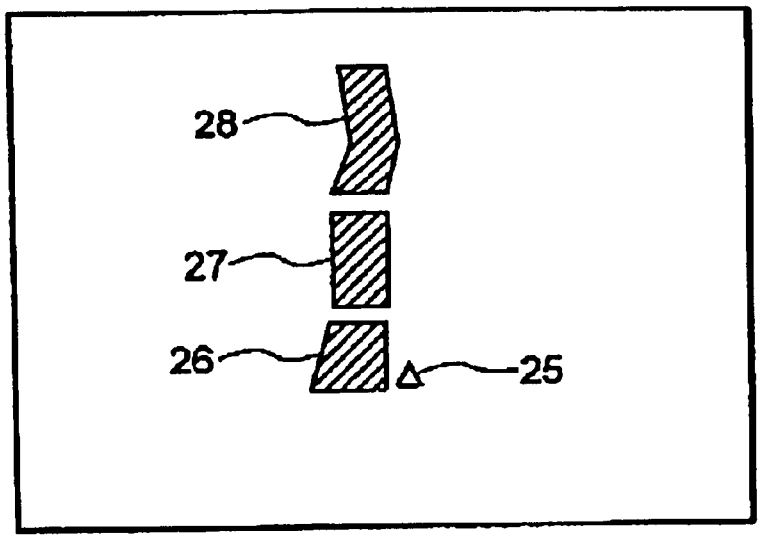

In FIG. 4, 25 is the current position and 26, 27, and 28 are cells, among the cells contiguous with the blank in which the current position is located, which are contiguous with the left side of the blank when for example travel is restricted to the left side.

Figure 5:
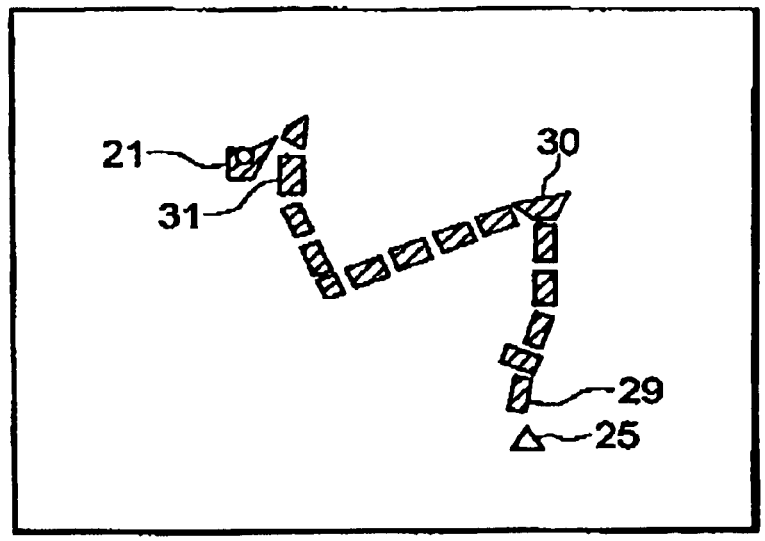

FIG. 5 shows the cells, among the cells contiguous with the blanks comprising the course from the current position to the destination, which are contiguous with the left side of the blanks when for example travel is restricted to the left side.

Figure 6:
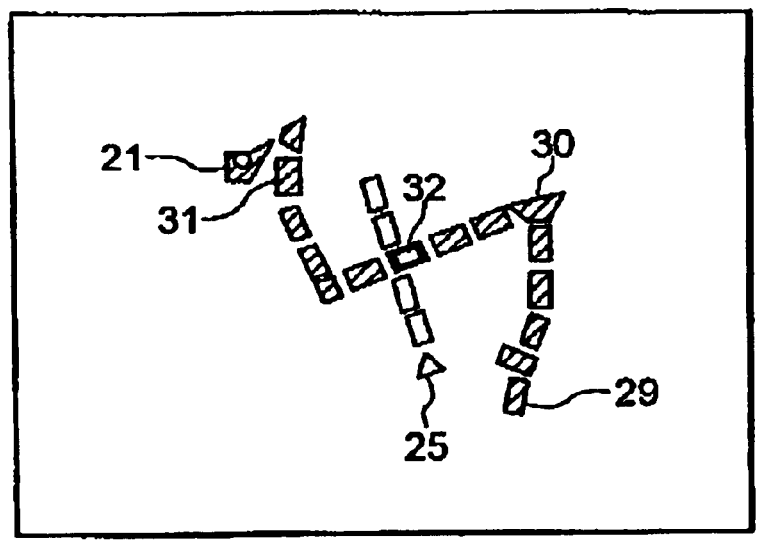

FIG. 6 shows cells 29, 30, and 31 contiguous with the left side of the blanks comprising a course. In this example, if the current position deviates from the course in the travel, when a cell, among the cells contiguous with the blank in which the current position is located, contiguous with the left side of the blanks matches with a cell contiguous with the course, a common cell 32 is displayed highlighted.

Figure 7:
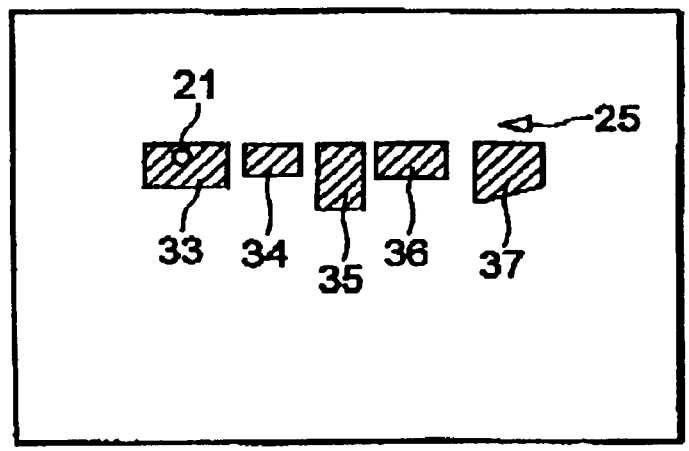

FIG. 7 shows common cells 33, 34, 35, 26, and 37 highlighted when the cells relating to the destination and cells relating to the current position generate two or more common cells.

Figure 8:
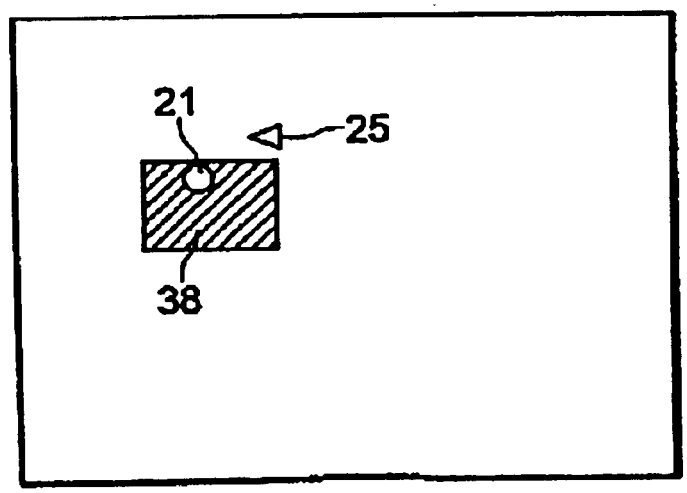

FIG. 8 shows a common cell 38 highlighted when the cells relating to the destination and the cells relating to the current position generate a single common cell.

Figure 9:
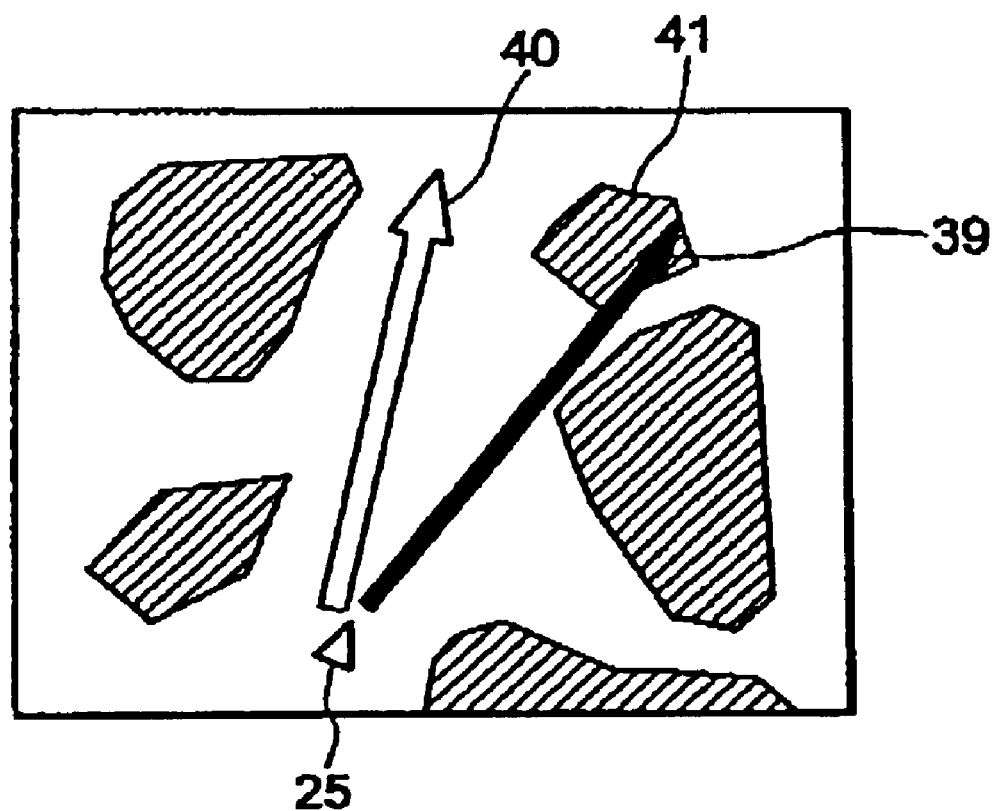

FIG. 9 shows a vector 39 of the moving body and an ideal vector 40 for avoiding a cell 41.

As general examples of the moving body, when the navigated area is the land, there are a pedestrian, pushcart, bicycle, motorcycle, ordinary size vehicle, and large size vehicle. When the navigated area is the sea, there are boats and ships. When the navigated area is the air, there are helicopters, small planes, and large planes. The moving body can be classified into these types.

There are diverse modes of travel depending on the type of the moving body and the condition of the navigated area. Dynamic information on congestion, accidents, roadwork, and the weather in the case of the land and the wind currents, ocean currents, and weather in the case of the sea and air become important information.

A navigation system should be constructed for each corresponding type as follows:

In the case of a pedestrian as a moving body traveling on the land, unit areas not suitable for travel are designated as cells as follows.

The land may be classified into city streets and the countryside. Units of areas not suitable for travel by a pedestrian are found with reference to physical and artificial travel factors.

It is also possible to evaluate suitability from the viewpoints of economy and efficiency.

Cells are unit areas not suitable for travel by a pedestrian and are independent from other cells. Between these cells are blanks. These blanks are suitable for travel.

The areas surrounded by blanks constitute unit areas since they are independent.

In general, cells are not suitable for travel due to physical and artificial factors. Cells may be classified into physical cells which it is dangerous or difficult for a pedestrian to walk through and artificial cells not suitable for travel due to legal restrictions, ownership rights, or controls. The blanks surrounding a physical cell are suitable for a pedestrian to walk through and include, in the case of city streets, roads over which people can pass, squarest and, if passable, passageways in facilities and, in the case of the countryside, the entire area except for cells since the countryside is suitable for a person to walk through or travel over except at areas impossible or difficult to walk through or restricted due to some reason or another.

The evaluation of whether or not there is suitability differs depending on the individual nature of the person as well, so there are also examples where computation and retrieval of cells and blanks corresponding to specific missions, physical strength, skill, occupation, etc. are requested. In such a case, various factors are stored as data and cells and blanks presented accordingly.

In addition to blanks surrounding cells, blanks not surrounding any cells, for example, roads, squares, and other areas suitable for travel in the cells, may be handled as additional information.

Theme parks, subway stations, department stores, hospitals, art museums, factories, warehouses, and other facilities may also be divided into cells and blanks for computation or retrieval and output or display.

Other types of moving bodies are pushcarts and bicycles. Areas may be divided into cells and blanks by a separate evaluation as to whether there is suitability in view of the functions of these devices.

There are diverse physical conditions and artificial conditions used as the criteria for dividing areas into cells and blanks for motorcycles and vehicles. These also differ depending on the functions of the moving bodies, individual characteristics, mission of the travel, legal restrictions, controls, etc.

The size of a vehicle determines whether physical passage is possible. On city streets, in particular, the suitability is evaluated differently depending on the traffic regulations.

Since the evaluation also differs depending on the mission and business, in practice, it is possible to construct a general system which determines the passability physically and provide additional information on artificial conditions such as legal restrictions, controls, etc. for the type of the moving object such as a motorcycle, small size vehicle, ordinary size vehicle, large size vehicle, and special vehicles together with the basic information of the cells and blanks.

As an example, the passability may be evaluated and the cells computed or retrieved in accordance with the above types of objects.

When evaluating the roads and areas in a region by the type of moving object, in particular on city streets, the sizes of the moving objects may be divided into ranks and the roads and areas ranked accordingly, so cells also can be ranked according to what rank of roads and areas are in the cells.

Alternatively, the cells may be ranked in accordance with the distance from the current position to the destination.

At this time, the roads and areas may be evaluated and the suitability of the cells determined by the distance.

It is also possible to perform processing dividing cells overlaying a line segment connecting the current position and the destination by any number and treating as single cells the various groups of cells obtained as a result or to similarly perform processing dividing cells contiguous with the course from the current position to the destination by any number and treating as single cells the various groups of cells obtained as a result. Which number to divide by is preferably determined in proportion to the distance from the current position to the destination.

While depending on the type of the moving object, various conditions of the same, the mission of the travel, and the intention of the user, as a general example, it is preferable to link the cells classified by the evaluation of the roads and areas belonging to them with the distance from the current position to the destination and make the length of the distance and the size of the cells proportional.

For the cell in which the destination is located, it is preferable to compute or retrieve a smaller cell at the final scene of the travel, for example, at the stage of approaching the destination.

It is also possible to use a result of linkage the distance from the current position to destination and a cell.

The result is similar since the cell found becomes smaller the shorter the distance from the current position to the destination.

It is also possible to compute or retrieve regions containing a road or area restricted to control traffic such as through direction restrictions, weight restrictions, and vehicle type restrictions as cells.

These restrictions may be handled all together or selectively.

Further, regions may be evaluated as cells when lacking suitability due to poor law and order or safety.

It is also possible to evaluate and compute or retrieve regions as cells due to frequent lack of suitability statistically.

In this way, typically, the passability or the suitability for travel may be evaluated by the type of the moving object, the distance from the current position to the destination, various restrictions, properties, etc.

Alternatively, suitability for the type of the moving object, the mission of the travel, the skill of the user, economy, and other travel factors maybe stored as data relating to cells, suitability evaluated with reference to any set travel factors, and cells evaluated as suitable for all of the set travel factors presented.

At this time, the blanks surrounding the presented cells become the areas suitable for travel. The route can be selected based on the judgement that the outer circumferences of the presented cells have passability.

As a general example, cells for which suitability is determined based on the type of the moving object, in particular size, are converted to data and stored in the storage unit 7. When the type of a moving object is input, cells are retrieved according to the type of the object and the cells found are output or displayed by sound or image etc.

Similarly, cells for which suitability is determined based on various restrictions may be converted to data and stored in the storage unit or cells may be determined and converted to data based on other factors. These cells may also be retrieved and output or displayed by sound or image etc.

Cells relating to travel may also be computed or retrieved based on net data of the blanks, the areas expanded until stopped by the blanks by a program, and the expanded areas highlighted by color, signs, lines, etc.

The cells computed or retrieved in the embodiments may be highlighted by special means of expression or the cells may be left empty and the rest of the area other than the cells highlighted.

The areas of the cells may also be utilized as empty spaces for presenting additional information.

When computing or retrieving cells based on information such as the route, current position, heading, destination direction, destination, course, line segment connecting the current position and destination, blanks in which the current position and destination are located, land to be traveled over, etc., roads, areas, and other blanks maybe displayed on a screen, the areas of the cells expanded until stopped by the blanks, and the areas obtained by expansion highlighted to show the blanks and cells located in the navigated area together.

The blanks may be classified or ranked by size, existence of restrictions, tolls, and other properties, conditions, individual natures, and factors enabling classification of blanks, the areas expanded until stopped by the corresponding classifications or ranks, and the cells and blanks thus obtained displayed.

The cells may be expressed by colors, lines, symbols, etc., and the blanks insides the cells and the outside blanks left empty or expressed by colors, lines, symbols, etc. different from the cells.

The blank in which the current position is located may be made any area, that area expanded until stopped by the blanks of the same class or rank as the blank in which the current position is located, and the obtained area expressed as a cell.

Alternatively, when classes or ranks are hierarchical or the difficulty of travel is used as a factor for classification or ranking, a blank of a class or rank where the difficulty becomes higher may be handled so as not to stop expansion of the area.

When information relating to the destination is input by the input unit and computing or retrieving a cell in which the destination falls, when the cell is determined by the type of the moving object, the mission of the travel, the status, the properties of the regions and other factors, the blanks contiguous with the cell and the cells contiguous with the blanks may be output or displayed and the cells relating to the current position computed or retrieved and displayed based on the class or rank the same as the cell at that time.

Cells may be found by expansion until being stopped by the blanks of the same class or rank as the blank in which the current position is located. When the destination is in a blank or is near a blank inside a cell, it is preferable to find the cells by expansion until being stopped by blanks of the same class or rank as these blanks.

The blanks close to the destination or in which the destination is located may be found and output or displayed, and cells found based on the blanks of different classes or ranks may be output and displayed.

Cells found based on the blanks close to the destination or in which the destination is located and cells found based on the blank in which the current position is located may also be displayed together.

Generally, cells are computed by input of factors relating to travel, but as explained above cells may also be already stored as data in the storage unit 7.

Cells may be determined for various types of moving bodies linked with the types of the moving bodies and the cells retrieved in accordance with the type selected.

When a motorcycle is selected and set as the type of moving object, cells unsuitable for a motorcycle are retrieved, while when a large size vehicle is selected, cells unsuitable for a large size vehicle are retrieved and output or displayed.

Hierarchical data of cells is created from pedestrians and motorcycles to large size vehicles and output when selected.

When cells belonging to one level are output and displayed, cells of another level may also be displayed. In this case, the cells of the main level and the cells of the secondary level should be discriminated from each other in the display.

The main cells may be highlighted or the secondary cells may be displayed by just the blanks surrounding them.

The types of the moving objects and hierarchical arrangement of the cells may be handled simply as well. When the types of moving objects are set with general reference to the hierarchy of the moving objects and cells, standard cells corresponding to the types may be retrieved and output or displayed or the user may select any level of cells considered appropriate and have the selected cells retrieved.

Unit areas of the cells may also be highlighted or the blanks surrounding the cells may be highlighted.

When there is meaning in the classification due to the differences in properties such as with expressways, general roads, toll roads, private roads, etc., these types of blanks may be handled and the areas expanded until stopped by these blocks to find the areas of the cells. Further, when the current position is in a certain type of blank, the areas should be expanded until stopped by blanks of the same type as the blank in which the current position is located.

When the navigated area is the countryside, the cells may be computed or retrieved by the functions of the moving object and individual nature of the user. The cells may be determined with reference to the functions of the moving object and individual nature for wetlands, bad roads, pastures, steep roads, etc.

Further, as a typical example, priority may be given to the travel factors and the cells computed or retrieved and output or displayed based on essential factors. Factors may be gradually input to set ranks of types of cells shown based on the judgement of the user.

In general, the type of the moving object may be input with priority and then the cells changed in rank with reference to the distance between the current position and destination, the cells overlaying the line segment connecting the current position and destination, and the cells contiguous with the blanks comprising the course from the current position to the destination.

When continuity of cells is not broken by railroad tracks, rivers, etc., the cells overlaying the line segment connecting the current position and destination and the cells contiguous with the blanks comprising the course are presented together. To give switchability between the cells overlaying the line segment and the cells relating to the course, the rank may be changed until cells of the two groups have continuity.

The destination is normally in a cell, so when preparing the destination data, the lowest level cell is given as attribute data of the destination to part of the data of the destination. When information relating to the destination is input, the position of the destination and the lowest level cell to which the destination belongs are retrieved. Cells of high ranks may be computed or retrieved in accordance with need in the different embodiments.

In the case of a destination set freely, the area may be expanded from the destination until being stopped by the blanks to find the cell. Alternatively, when cells are prepared and stored as data, the lowest level cell may be found by computing or retrieving the cell in which the destination falls.

Alternatively, the highest level cell of the navigated area in which the destination falls may be computed or retrieved and a lower rank cell in which the destination is located may be computed or retrieved.

In this case, the lower level cell is included in the higher level cell.

In the case of the current position, the area may be expanded from the current position until being stopped by the blanks to find the cell. Alternatively, when cells are prepared and stored as data, the cell in which the current position is located may be computed or retrieved. Alternatively, when the current position is located in a blank, the smallest loop of the blank in which the current position is located may be computed or retrieved to find the smallest cell.

As one example, when pseudo sub cells are set and information relating to the destination and information relating to the current position are input, the sub cells closest to the destination and the current position may be computed or retrieved from these sub cells by a closest point search or other technique, then the cells in which these sub cells fall may be computed or retrieved.

As a simple example, cells corresponding to types of moving objects may be stored as data and unit areas not suitable for pedestrians, motorcycles, ordinary size vehicles, and large size vehicles selected and combined by the user and a program.

In addition to the system of changing between the higher level cells and lower level cells, when simplifying the system and stressing the environment of the current position, leaving aside the destination, the cells around the current position, the cell to which the current position belongs, the cells near the current position, the cells contiguous with the blanks surrounding these cells relating to the current position and the destination direction, heading, track, landmarks, intersections, and various information such as business information, consumer information, and leisure information may be output and displayed.

Further, congestion, accidents, roadwork, weather, and other dynamic information may be output and displayed.

Further, as typical examples, the navigated area may be the countryside, a park, zoo, theme park, etc. Broadly, it also may include the sea and air. Cells overlaying the line segment connecting the current position and the destination may be computed or retrieved and output or displayed.

Information on the area around the current position may also be presented in accordance with need to assist the travel. Further, information relating to destinations may be presented to assist the selection of a destination.

Information relating to the current position, destinations, landmarks, etc. may also be input by making use of pamphlets, magazines, etc. and reading numbers and codes printed on the paper or manually by the user.

Messages may also be provided using figurines giving sound or visual effects so as to add some interest.

Sound and visual effects are preferably output and displayed at different stages in the process of reaching the destination.

When cells are stored as data, the cells near those cells, contiguous blanks, cells at the same side areas, higher and lower level cells, etc. may be given as data and used for facilitating the computing or retrieval.

When the navigated area is the sea, the evaluation of the depth of the ocean, ocean currents, wind and other weather, and other factors differs depending on the size and type of the ship. Therefore the cells of the unit areas not having suitability differ.

In general, the basic cells are computed and processed based on the depth of the ocean and the shape of the straits and bays as static conditions, and the direction and speed of the ocean currents and the direction and speed of the wind and other conditions are added as dynamic conditions.

Economy should also be considered in the course for reaching a destination from the current position. The heading and speed may be computed based on the static and dynamic conditions and the size and type of the ship.

In the case of automatic navigation, these computations and operations are performed automatically. In manual navigation, however, the cells determined by the static conditions, the vector of the moving object obtained by the vectors given to the ship by the ocean current and wind and the vector resulting from the power of the ship and steering, and the ideal vector computed from the static conditions and dynamic conditions to avoid the cells are preferably computed and output or displayed.

When the navigated area is the air, the suitability of the air is determined by the type of aircraft. There are also differences due to the course, takeoff, and landing.

In all cases, generally there is a basically planned route, but changes in the weather, wind current, etc. should also be considered. When these dynamic conditions are given, the cells are computed three-dimensionally.

At this time, the cells not suitable for the travel, the vector of the aircraft, and the ideal vector are computed and output or displayed.

The speed may be set and the aircraft steered automatically so that the ideal vector and the aircraft vector match.

The speed may also be set and the aircraft steered manually.

Next, examples of the present invention will be explained.

The examples are divided into Examples 1 to 26 for convenience in the explanation.

In the examples, the explanation will be given assuming circuit elements having predetermined processing functions as the central processing unit 2.

The examples may be freely selected and combined in accordance with need for specific applications and locales.

EXAMPLE 1

In this example, information relating to travel is input by the input unit 1. At this time, data relating to the navigated area is retrieved from the storage unit 7, computed or retrieved by the computing and retrieving means 6 through the processing unit 5, and output or displayed at the output unit 3.

Various modes are possible as to how to give the information relating to the travel to the input unit 1 and what gives this type of information to the input unit 1.

A voice input unit, keys, touch panel, bar code reader, wireless or wired receiver, etc. may be used to input information relating to the travel such as the current position, destination, type of moving object, weather, congestion, accidents, and other dynamic information and other additional information and information on restrictions, controls, economy, skill of the user, cost, and other restrictive factors, economic factors, and human factors, and other grounds regarding the possibility and suitability of travel in the navigated area concerned. When this is given, unit areas not suitable for travel are computed or retrieved as cells and output or displayed by sound or images at the output unit 3.

The navigated area covered is determined by designating a range of expansion in the heading or is determined as being in the range of data relating to the navigated area when the current position is obtained by input by the user, fixing by satellite signal or ground station signals, receiving positional information by sound waves, laser, beacons, and other various sensors for fixing the current position.

When the navigated area is determined by the range of expansion in the heading from the current position, the size of the range is determined by a user setting or becomes the range of possible movement in a unit time based on the performance of the moving object.

Alternatively, cells may be computed or retrieved and output or displayed for a navigated area determined by giving priority for example to economic factors in the information relating to travel or priority to the performance of the moving object or priority to weather conditions in the retrieval and selection of the navigated area.

Further, a suitable navigated area may be selected with reference to the distribution and shape of the cells, and the cells of that navigated area output and displayed.

Another possible use is to select the navigated area with reference to the ration of area occupied by the cells in a certain range.

Further, it is possible to select several travel factors forming grounds for computing or retrieving cells among the information relating to travel, compute or retrieve cells based on these travel factors, and select the navigated area while incorporating the computed or retrieved cells.

EXAMPLE 2

Here, the navigated area covered is planned in advance. At this time, the entire range or part of the range of the navigated area planned or considered is input by the input unit 1. The data relating to that range is retrieved from the storage unit 7, the cells are computed or retrieved by the computing and retrieving means 6 through the processing means 5, and the cells are output or displayed by sound or image at the output unit 3.

Various modes regarding how to give information to the input unit 1 or what to give such information to the input unit 1 will be explained next.

Any range may be given by input by a voice input unit, keys, touch panel, etc. by some sort of information specifying that range such as a name, symbol, code number, code name, landmark, etc. When this is given, the unit areas not suitable for travel present in that range are computed or retrieved as cells and output or displayed by sound or image from the output unit 3.

When the navigated area is the sea or air as well, cells are similarly output or displayed. The scale of the range of the navigated area may be changed by voice or key operation etc.

According to the present invention, the information necessary at the time of travel is extracted. Words, illustrations, and other additional information may be omitted as being of secondary importance. Therefore, even if the screen is small such as with one provided on a mobile phone, electronic memo book, etc., it is sufficient for use. This allows navigation by a mobile phone when walking. Further, it allows use by setting the mobile phone etc. at a predetermined position to connect it to a vehicular system and displaying the cells on the windshield or displaying them on a panel when riding a motorcycle or driving a vehicle.

As an example, a portable terminal such as an electronic memo book, portable PC, etc. may be provided with a communications function, locator, etc. The above application would then become possible.

The locator may make use of positioning by satellite signals, positioning by ground base signals, and input of information by the user. Further, in the case of the land, transmitters for emitting positional information and regional information may be placed at roadside facilities, buildings, telephone boxes, vending machines, etc.

The apparatus of the present invention may also be attached to a pushcart and used inside facilities such as department stores, art museums, hospitals, and theme parks. The position may be input by the user or transmitters may be placed at key locations.

The data relating to the navigated area is stored in the storage unit 7. It is also possible however to transmit data on a specific navigated area by a communications system or provide it by devices emplaced in the navigated area. The data may also be rewritten.

Any specific medium may be used such as a CD, IC card, chip, or flash memory.

In the related art, much use was made of words and illustrations. In the present invention, however, this additional information is output or displayed selectively for specific purposes, so utility can be stressed.

Tourist information, shopping information, consumer information, business information, etc. may be specifically selected, so the information becomes more useful than information provided mixed all together.

When showing a landmark at an intersection, the name of an intersection, etc. in a region, the information may be provided when approaching that intersection or at a designated time.

EXAMPLE 3

Here, the name of the destination, the code name, code number, symbol, telephone number, position, etc. is given. At this time, the cells around the destination are computed or retrieved and output or displayed.

Any navigated area in a radius around the destination set freely by the user or set automatically may be output and displayed and cells shown.

At this time, the cells are classified or ranked automatically in accordance with the scale of the navigated area or by free selection. At this time, cells of suitable classifications and ranks are preferably output and displayed.

Cells with small ranks may be switched to cells with larger ranks along with an increase in the radius.

EXAMPLE 4

Here, the destination is inside of a cell and belongs to that cell. At that time, that cell is displayed and the destination is shown inside the cell by a sign, symbol, etc.

When the destination is positioned contacting a blank contiguous with the cell in which the destination falls, that blank as classified as the blank closest to the destination. If there is no closest blank and the destination is positioned inside the cell, when the moving object reaches the cell or when the traveler changes the moving object, whether there is a passable area inside the cell is computed using the moving object as a factor. If there is a passable area, this is defined as a blank and a cell surrounded by that blank is formed. At that time, this cell may also be output or displayed.

When no such cell is formed, the blank is output or displayed in the cell to which the destination falls.

EXAMPLE 5

Here, the destination is not inside a cell and is located in a passable area, that is, a blank. At this time, the position of the destination in the blank is shown, and the cells near the destination are computed or retrieved and output or displayed at the output unit.

Just one of the nearby cells may be output or displayed or two or more or cells in a certain radius from the destination may be output or displayed.

General examples of when a destination is in a blank include when a destination is not some sort of facility, but when a certain location is made the destination or when a pont of passage is set as a two-dimensional destination. This is particularly useful when the navigated area is the sea or air.

EXAMPLE 6

Here, the current position of the moving body is given by an absolute position such as the longitude and latitude, a relative position in a coordinate system, a facility serving as a landmark, place name, point name, road name, intersection name, relative position with a ground station, or other information determining the current position. At this time, the cell of the navigated area in which the current position is located is computed or retrieved and output or displayed.

The size of the navigated area and the rank of the cell may be made proportional to each other.

Further, the navigated area in which both the destination and the current position are located may be selected and set by the user or automatically set.

When outputting or displaying a navigated area not including the destination, the destination direction is indicated.

Alternatively, part of the cells contiguous with the blanks comprising the course explained below may be output or displayed or part of the cells overlaying the line segment connecting the current position and destination may be output and displayed.

EXAMPLE 7

Here, the current position falls inside a cell. At this time, cells of classes and ranks inherently not suitable for travel are computed or retrieved and output or displayed or the blanks showing the passable areas are computed or retrieved and output or displayed.

Alternatively, the blanks of all classifications and ranks inside the cell in which the current position falls are computed or retrieved and output or displayed.

In this case, whether there is unsuitability due to physical factors or due to restrictions and controls can also be output or displayed.

EXAMPLE 8

Here, the current position does not fall in a cell, but falls in a blank. At this time, the cells near the current position are computed or retrieved and output or displayed.

The cells in a predetermined radius contiguous with the blank in which the current position is located are computed or retrieved or just the closest one is computed or retrieved. When the blank has expandability, the cells contiguous with the blank are computed or retrieved and output or displayed in accordance with the expandability of the blank.

When the navigated area is the sea or air, at least two cells are output or displayed to express the expandability of the blank in which the current position is located. If three or more cells are output or displayed, the expandability and the shape of the blank can be expressed.

In this example, the cells are preferably computed or retrieved along the heading of the moving object.

When the navigated area is the land, in the case of the countryside, two or more cells are output or displayed to express the expandability and shape of the blank. In the case of city streets, the shape and density of the passable and selectable blanks may be expressed.

At this time, the cells surrounded by blanks of the same class and rank as the blank in which the current position is located may also be computed or retrieved.

When both the current position and destination are being output or displayed, the cells surrounded by blanks of the same class and rank as the blank in which the destination is located or the blank closest to the destination when the destination falls in a cell may be computed or retrieved and output or displayed based on these blanks.

Alternatively, when the cells overlaying the line segment connecting the current position and destination or the cells contiguous with the blanks comprising the course from the current position to the destination are computed or retrieved or when these cells are output or displayed, the cells of the same class and rank as these cells may be computed or retrieved as cells near the current position.

Alternatively, the user may freely select the class or rank of cells in accordance with the type of the moving object, mission of the travel, economy, required time, congestion, accidents, and other factors and have the cells computed or retrieved and output or displayed in accordance with that selection.

EXAMPLE 9

Here, the cells around the destination and the cell in which the destination falls are both output or displayed or output or displayed together with the cells near the destination. At this time, the cell in which the destination falls and the cells near the destination are output or displayed highlighted.

EXAMPLE 10

Here, the cells around the current position and the cell in which the current position falls are both output or displayed or output or displayed together with the cells near the current position. At this time, the cell in which the current position falls and the cells near the current position are output or displayed highlighted.

EXAMPLE 11

Here, the areas having suitability for travel by the moving object are defined as blanks and are computed or retrieved and output or displayed together with the cells surrounded by those blanks.

The type of the moving body, the skill of the user, the mission, economy, efficiency, difficulty, contractual conditions, legal conformance, mode of travel, weather, wind currents, wind, other unforeseeable situations, and diverse other factors are involved in travel.

When information regarding these travel factors can be obtained, the passability is examined by evaluating the extent, possibility, difficulty, necessity, etc. of the travel with reference to these.

A model of passability may be created, the area covered by the travel is classified into cells and blanks, the cells and blanks classified and ranked for evaluation according to their properties, meaning, physical shape, effect, etc., data on the navigated area and information relating to the travel given and the travel factors extracted, and the cells and blanks computed or retrieved accordingly.

Cells are surrounded by blanks and form independent areas.

When the cells are computed or retrieved and output or displayed and the blanks surrounding these cells are output or displayed, sound or images may be used. When displaying images, the types of the lines and the colors may be freely selected to give visual recognition to the cells and blanks.

EXAMPLE 12

Here, the cells and the blanks surrounding the cells are output or displayed. At this time, the cells contiguous with the blanks surrounding the cells are computed or retrieved and output or displayed.

When the cells contiguous with the blanks are output or displayed, basically the cells surrounded by the blanks of the same class and rank as those blanks are computed or retrieved and output or displayed.

When the current position falls in a cell, all of the cells contiguous with the blanks surrounding the cell are computed or retrieved and output or displayed, while when the current position is in a blank, all of the blanks contiguous with that blank are computed or retrieved and output or displayed.

EXAMPLE 13

Here, the blanks surrounding a cell have expandability enabling them to be expanded and lengthened. At this time, they are defined as expandable blanks. These expandable blanks are computed or retrieved and output or displayed along with the output or display of the cells.

If the properties, meaning, suitability, effect, and shape of the cells are deemed the internal attributes of the cells, the external attributes of the cells become the properties, meaning, shape, etc. of the blanks surrounding the cells.

For a blank, the expandability is particularly important. The expandability of the blanks surrounding cells become important in travel as external attributes of the cells.

When the blanks surrounding cells and the expandable blanks are output or displayed along with the output or display of the cells, blanks of a class or rank the same as the blanks surrounding the cells are computed or retrieved and output or displayed when in a cell in which the current position falls.

EXAMPLE 14

Here, the blanks surrounding a cell are expandable blanks. At this time, the cells contiguous with the blanks are computed or retrieved and output or displayed.

The cells contiguous with expandable blanks need not be cells of the same class or rank as the cell surrounded by the expandable blanks and may also be cells of a different class or rank.

The cells may be made a higher level of size in proportion to the distance between the current position and the destination.

Further, they may be made cells of a class corresponding to the type of the moving object or may be made cells computed or retrieved with reference to economy, mission, skill, and other travel factors.

Alternatively, they may be made cells overlaying a line segment connecting the current position and destination or cells of the same class or rank as the cells contiguous with the blanks comprising the course from the current position to the destination.

When the blanks surrounding a cell are expandable blanks, the cells contiguous with all of the expandable blanks may be computed or retrieved and output or displayed and used for facilitating the selection of the route by the user.

EXAMPLE 15

When the destination falls in a cell, the cells contiguous to the blank closest to the destination are computed or retrieved and output or displayed, while when the destination falls in a blank, the cells contiguous with that blank are computed or retrieved and output or displayed. When the blanks are expandable blanks as well, they are similarly computed or retrieved and output or displayed.

When the destination is located in the blank, the cells contiguous with the expandable blanks in particular are output or displayed and the cells to be avoided are shown.

When the destination falls in a cell, the cells contiguous with the expandable blank closest to the destination are output or displayed, and the destination may be approached from any direction, cells are indicated as information for selecting the most advantageous blank among the passable blanks with reference to the travel factors at that time.

Specifically, when the navigated area is the sea or air, generally the destination is located in a blank, while when it is the land, generally it falls in a cell.

EXAMPLE 16

When the current position falls in a cell, the cells contiguous to the blank closest to the current position are computed or retrieved and output or displayed, while when the current position is located in a blank, the cells contiguous with the blank are computed or retrieved and output or displayed. When these blanks are expandable blanks as well, they are similarly computed or retrieved and output or displayed.

When the current position falls in a cell and the blank closest to the current position is an expandable blank, that cells contiguous with that blank are output or displayed and the distribution of the cells to be avoided is shown as information.

When the current position falls in a cell, this information is provided by making the cells contiguous with the blanks surrounding the cell the same class and rank as the cell in which the current position falls.

When the current position falls in a blank and the blank is an expandable blank, the cells contiguous with the expandable blank are output or displayed, the blanks of the same class and rank as the blank in which the current position falls are indicated, and an opportunity for selection therefore given.

EXAMPLE 17

Here, the current position is located in a blank including an expandable blank. At this time, when travel in the blank is restricted to the left side, the cells contiguous with the left side of the blank among the cells contiguous with the blank are computed or retrieved and output or displayed. When restricted to the right side, similarly the cells contiguous with the right side of the blank are computed or retrieved and output or displayed.

This is done mainly when the navigated area is on the land. In this mode, it becomes possible to provide information assisting the selection of a route by the output or display of the cells without obstruction by directional restrictions such as "no right turn" or "no left turn".

EXAMPLE 18

Here, the destination falls in a cell and a blank closest to the destination can be obtained. At this time, the cells at the same side area of the blank as the cell to which the destination falls among the cells contiguous with that blank are computed or retrieved and output or displayed.

The same is true when the blank is an expandable blank.

When the navigated area is the land, at which side area of the blank the cell in which the destination falls is positioned is particularly useful information when the moving object is a vehicle.

When reaching the destination, one is often hindered by directional restrictions or restrictions on passage to only the right or left right before reaching the destination.

Selection of the route is assisted by outputting or displaying the cells of the same side area as the cell in which the destination falls.

EXAMPLE 19

Here, information relating to the destination and information relating to the current position are input. At this time, the line segment connecting the destination and the current position is found and the cells overlaying the line segment are computed or retrieved and output or displayed.

When the navigated area is the sea or air, the distribution of cells present between the current position and destination is presented.

On the sea or in the air, travel is possible in all directions so long as whether there are any cells on the route is indicated.

When the navigated area is the land, which class or rank of cells should be presented involves diverse travel factors. It is necessary to set travel factors for computing or retrieving the class and rank.

Patterns of several modes of settings may be created, the user may set the travel factors from a menu at the time of travel, or the basic travel factors may be set in advance. The factors may be added or changed in accordance with the specific travel conditions based on these settings and the cells computed or retrieved accordingly.

For example, the moving objects may be classified into pedestrians, motorcycles, ordinary size vehicles, and large size vehicles and these set as travel factors.

Whether the vehicle is one for emergency use for which directional restrictions are lifted or a general one, whether the user is elementary, intermediate, or advanced in skill, the performance of the moving object when the navigated area is the countryside, and, in addition to these travel factors, factors relating to congestion, accidents, roadwork, and other circumstances may be added.

Cells determined in class or rank by these factors may be computed or retrieved.

In this example, when computing or retrieving the cells overlaying the line segment connecting the current position and destination, the continuity of the cells is sometimes broken.

That is, since the cells are computed or retrieved as independent areas surrounded by blanks, when for example there is a railroad track, river, etc. in the navigated area, even if the cells are indicated based on the travel factors selected as explained above, the continuity of the cells is sometimes broken by the railroad track, river, etc. in the class or rank of the cells.

At this time, the cells of the higher class or rank which include the cells already indicated may be computed or retrieved by processing by a program and the cells of a class or rank where continuity is not broken by a track or river therefore computed or retrieved and output or displayed.

Further, railroad crossings, bridges, land bridges, tunnels, and other roads passing over a railroad track or river may be defined as blanks, the cells surrounded by such blanks separately computed or retrieved, and the cells sharing the same blanks surrounding the cells computed or retrieved in order to secure continuity of the cells.

EXAMPLE 20

Here, information relating to the destination and information relating to the current position are input. At this time, the course from the current position to the destination is found and the cells contiguous with the blanks comprising the course are computed or retrieved and output or displayed.

In this example, the continuity of the cells is not an issue. The selection of the class or rank of the cells becomes possible.

For cells relating to the current position, cells relating to the intervening distance, and cells relating to the destination, when for example the cells relating to the current position are cells of a lower class or rank, the lower level cells are indicated until the current position shifts to the blanks comprising the course; when the cells relating to the current position are higher level cells, the higher level cells are indicated when the current position is located at the blanks surrounding the cells; while when the current position falls in a higher level cell and there are lower level cells contained in the higher level cell, the lower level cells are computed or retrieved and output or displayed.

In general, lower level cells fall inside higher level cells.

Except in the case where railroad crossings, bridges, land bridges, and tunnels are defined as blanks and these blanks surround lower level cells to form unit areas, the lower level cells can be processed as falling inside higher level cells. In special cases, they may be stored as data and processed as attribute data of higher level cells and contiguous cells.

For cells relating to the intervening distance, the distance from the current position to the destination, the class or rank of the cells surrounded by the blanks comprising the intervening distance, and congestion, accidents, roadwork, and other dynamic conditions may be added as travel factors.

The cells of the higher rank or class than the distance from the current position to the destination may be shown.

The user may also freely select and set higher level and lower level cells of cells surrounded by blanks comprising the intervening course.

When obtaining dynamic information on congestion, accidents, roadwork, etc. and blanks comprising the intervening course lose suitability for travel, generally the lower level cells have to be indicated.

The lower level cells of the cells relating to the destination may be computed or retrieved as the distance between the current position and destination becomes shorter.

When the destination falls in a cell, there are blanks which do not surround a cell in the cell. These blanks are indicated if those blanks are useful for reaching the destination.

EXAMPLE 21

Here, cells contiguous with blanks comprising the course from the current position to the destination are indicated. At this time, if travel is restricted to the right side or left side of the blanks, the cells contiguous with the right side of the blanks are output or displayed when travel is restricted to the right side and the cells contiguous with the left side are output or displayed when travel is restricted to the left side.

There are many regions where left turns are prohibited when travel is restricted to the right side and where right turns are prohibited when travel is restricted to the left side. This example applies to such regions.

EXAMPLE 22

Here, the cells around the destination, cell in which the destination falls, cells near the destination, cells contiguous with the blanks surrounding these cells, etc. are defined as cells relating to the destination, while the cells around the current position, the cell in which the current position falls, the cells near the current position, the cells contiguous with the blanks surrounding these cells, etc. are defined as cells relating to the current position. When a cell relating to the destination and a cell relating to the current position match, this is output or displayed highlighted as a common cell.

The speed of reaching the destination may be divided into stages and the stages changed in means of expression and highlighted by sound or images.

Finally, the destination and the current position approach each other. Several modes of approach can be set at the stage before that, however, such as when the cell in which the destination falls and the cell in which the current position falls match, when the cell in which the destination falls and a cell near the current position match, etc. These may be be suitably classified and highlighted.

EXAMPLE 23

When cells relating to the destination and cells relating to the current position match and there are two or more common cells, these may be highlighted. When the blanks surrounding these cells match, these may be defined as common blanks and the common blanks output and displayed highlighted.

This is done when there are two or more common cells between the cells contiguous with the blanks surrounding the cell in which the destination falls, the cells near the destination, etc. and the cells contiguous with the blanks surrounding the cell in which the current position falls, the cells near the current position, etc. or when there is a common cell between the cells around the destination and the cells around the current position.

When there are two or more common blanks, these may also be highlighted.

EXAMPLE 24

Cells overlaying the line segment connecting the current position and destination and the cells contiguous with the blanks comprising the course from the current position and destination may be classified as cells relating to the destination. When there is a common cell with the cells relating to the current position, the common cell may be highlighted.

When there are two or more common cells, when there is a common blank, when there are two or more common blanks, etc., these states may also be highlighted.

Sound, images, and words may be used for highlighting.

EXAMPLE 25

The cells of the navigated area may be output and displayed and the speed of movement and direction of movement of the moving object output and displayed by a vector.

Cells and vectors may be presented for the countryside in the case of land and for the sea and area which can be traveled over in any direction.

On the sea or in the air, the fact that the vector changes due to the ocean currents or wind currents also cannot be ignored.

By showing the state of movement by a vector of the speed and direction and outputting and displaying the vector and cells together, information on whether travel will be obstructed by cells after the elapse of a certain time assuming the current state of movement can be provided.

In the countryside, cells may, be computed or retrieved based on travel factors such as the performance and functions of the moving object and the state of the navigated area.

The weather and mishaps may also be incorporated as dynamic information and the cells changed accordingly.

On the sea, the depth of the ocean floor, the coastline, the ocean currents, wind, and weather may be defined as factors and further the performance and function of the ship, the skill of the user, etc. may be defined as factors. The cells and the vector may both be shown. Depending on the size of the ship, change of the vector is sometimes difficult.

In this example, the vector is shown in a unit time in which change of the vector is allowed.

If some sort of mishap occurs hindering the travel, the cells are formed again. At this time, if dynamic information is sent by satellite or other monitoring systems, that information may also be used as a factor.

When the navigated area is the air, the cells are shown three-dimensionally. The changeability of the vector in a unit time differs depending on the type of the aircraft, so the performance of the aircraft is a basic travel factor.

A cell itself, even if the same, has to be changed in size depending on the type of the aircraft. When defining factors extracted from dynamic information as dynamic factors and factors extracted from static information as static factors, the cells formed by the static factors have only little correlation with the performance of the types of aircraft, while the cells formed by the dynamic factors have to be linked with the changeability of the vector due to the aircraft performance. When the changeability is excellent, no change in the shape of a cell is required. When the changeability is poor, the cell has to be enlarged.

The same applies when the navigated area is the sea.

EXAMPLE 26

Here, the cells and the vector of the moving object are presented. At this time, an ideal vector not obstructed by the cells may also be computed or retrieved and output or displayed.

When cells are computed or retrieved and output or displayed from static factors and dynamic factors, the changeability of the vector as enabled by the performance of the moving object may be included as a factor, a vector avoiding the cells found as the ideal vector, and the vector of the moving object and the ideal vector both output or displayed.

When presented by an image, the visual recognition of the images of the vectors may be improved by highlighting the two vectors and not showing images of the cells while the ideal vector is being displayed.

If the cells are computed or retrieved for use as grounds for finding the ideal vector, they do not have to be particularly shown to the user.

CAPABILITY OF UTILIZATION IN INDUSTRY

When the navigated area is the land, sea, or air, the suitability of the navigated area is evaluated with reference to the mission, skill, type of moving object, and other travel factors and unsuitable unit areas are presented as cells, so the user can easily use the blanks surrounding the cells in the same way as avoiding the cells.

Further, since cells are presented in various manners to show how the cells should be avoided, judgement on the heading when deciding what cells to avoid and what cells to use is assisted.

Since unit areas not suitable for travel are shown as cells, the user is freed from having to read a map or listening to the frequently mistaken, stressful guidance and can obtain useful basic information instantaneously.

Useful basic information can therefore be extracted, processed, and presented in a manner not placing an additional burden on the user.

Conventional development efforts lacked this thinking and idea and continued to focus on detailed maps or stress-inducing guidance. According to the present invention, however, basic information of "cells" is provided and therefore it is possible to give a navigation system safety, utility, and quick response.

In the examples where ideal vectors and vectors of the moving objects were presented, the burden of judgement and operation can be eliminated and safety improved by just setting the direction and speed so that the vector of the moving object matches the ideal vector.

What is claimed is:

1. A navigation apparatus for mounting in a moving object, the navigation apparatus comprising:
an input unit, a central processing unit, a storage unit, and an output unit, wherein said storage unit has a means for storing data relating to a navigated area, said input unit having means for inputting different information relating to travel according to a type of said moving object, when said moving object is traveling, said central processing unit having computing and retrieving means for finding from data stored in said storage unit, a unit area not suitable for travel as a cell when said information relating to travel is inputted, the cell is computed and retrieved corresponding to the type of said moving object and said output unit having means for outputting or displaying said cell, wherein the cells, including units which are not suitable for travel are regarded as significant and displayed so as to create an area which is suitable for travel according to the type of moving object.

2. A navigation apparatus as set forth in claim 1, wherein said central processing unit further includes means for finding a cell located in a certain range of the navigated area when information relating to said range is input from said input unit and said output unit has a means for outputting or displaying said range and a cell located in said range.

3. A navigation apparatus as set forth in claim 1, wherein said central processing unit further includes means for finding a cell around a destination when information relating to said destination is input from said input unit and said output unit has a means for outputting or displaying said cell around said destination.

4. A navigation apparatus as set forth in claim 1, wherein said central processing unit further includes means for finding a cell in which a destination falls when information relating to said destination is input from said input unit and said output unit has a means for outputting or displaying said cell in which said destination falls.

5. A navigation apparatus as set forth in claim 1, wherein said central processing unit further includes means for finding a cell near a destination when information relating to said destination is input from said input unit and said output unit has a means for outputting or displaying said cell near said destination.

6. A navigation apparatus as set forth in claim 1, wherein said central processing unit further includes means for finding a cell around a current position when information relating to said current position is input from said input unit and said output unit has a means for outputting or displaying said cell around said current position.

7. A navigation apparatus as set forth in claim 1, wherein said central processing unit further includes means for finding a cell in which a current position falls when information relating to said current position is input from said input unit and said output unit has a means for outputting or displaying said cell in which a current position falls.

8. A navigation apparatus as set forth in claim 7, wherein a cell contiguous with a blank closest to a destination is computed or retrieved and outputted or displayed when outputting or displaying an expandable blank and a cell surrounded by said expandable blank.

9. A navigation apparatus as set forth in claim 8, wherein the cell positioned in a side area is the same as a cell in which a destination falls in the cells contiguous with the blank closest to the destination is computed or retrieved and outputted or displayed.

10. A navigation apparatus as set forth in claim 7, wherein a cell contiguous with a blank closest to a current position is computed or retrieved and outputted or displayed when outputting or displaying a blank including an expandable blank and a cell surrounded by said blank together.

11. A navigation apparatus as set forth in claim 1, wherein said central processing unit further includes means for finding a cell near a current position when information relating to said current position is input from said input unit and said output unit has a means for outputting or displaying said cell near a current position.

12. A navigation apparatus as set forth in claim 11, wherein a cell contiguous with a blank in which a current position is located is computed or retrieved and outputted or displayed when outputting or displaying a blank including an expandable blank and a cell surrounded by said blank together.

13. A navigation apparatus as set forth in claim 12, wherein, when travel is restricted to one of a right side and a left side of the cell contiguous with the blank, the cell contiguous with a right side of the blank is computed or retrieved and outputted or displayed when it is restricted to the right side and similarly the cell contiguous with the left side of the blank is computed or retrieved and outputted or displayed when it is restricted to the left side.

14. A navigation apparatus as set forth in claim 1, wherein a cell around a destination and a cell in which a destination falls are computed or retrieved together, and said cell in which a destination falls is highlighted when outputted or displayed.

15. A navigation apparatus as set forth in claim 1, wherein a cell around a destination and a cell near a destination are computed or retrieved together, and said cell near a destination falls is highlighted when outputted or displayed.

16. A navigation apparatus as set forth in claim 1, wherein a cell around a current position and a cell in which a current position falls are computed or retrieved together, and said cell in which a current position falls is highlighted when outputted or displayed.

17. A navigation apparatus as set forth in claim 1, wherein a cell around a current position and a cell near a current position are computed or retrieved together, and said cell near a current position is highlighted when outputted or displayed.

18. A navigation apparatus as set forth in claim 1, wherein the area having suitability for the travel of the moving object is defined as a blank and said blank is outputted or displayed along with the output or display of a cell surrounded by said blank.

19. A navigation apparatus as set forth in claim 1, wherein a cell contiguous with a blank is computed or retrieved and outputted or displayed when outputting or displaying a blank and a cell surrounded by said blank.

20. A navigation apparatus as set forth in claim 1, wherein an expandable blank having expandability is outputted or displayed along with the output or display of a cell surrounded by the expandable blank when the blank is an expandable blank.

21. A navigation apparatus as set forth in claim 1, wherein a cell contiguous with an expandable blank is computed or retrieved and outputted or displayed when outputting or displaying an expandable blank and a cell surrounded by said expandable blank.

22. A navigation apparatus as set forth in claim 1, wherein a cell contiguous with a blank in which a destination is located is computed or retrieved and outputted or displayed when outputting or displaying a blank including an expandable blank and a cell surrounded by said blank together.

23. A navigation apparatus as set forth in claim 1, wherein a line segment connecting a destination and a current position is found and the cell overlaying the line is computed or retrieved and outputted or displayed when information relating to a destination and information relating to a current position are input by said input unit.

24. A navigation apparatus as set forth in claim 23, wherein when the cell overlaying the line segment and the cell relating to the current position match, the matching cells are highlighted as a common cell when outputted or displayed.

25. A navigation apparatus as set forth in claim 1, wherein a course from a current position to a destination is found and a cell contiguous with a blank having said course is computed or retrieved and outputted or displayed when information relating to the destination and information relating to the current position are input by said input unit.

26. A navigation apparatus as set forth in claim 25, wherein, when travel, is restricted to one of a right side and a left side of the cell contiguous with the blank, the cell contiguous with the right side of the blank having said course is computed or retrieved and outputted or displayed when it is restricted to the right side and similarly the cell contiguous with the left side of the blank is computed or retrieved and outputted or displayed when it is restricted to the left side.

27. A navigation apparatus as set forth in claim 25, wherein when the cell contiguous with the blank includes a course and the cell relating to the current position match, the matching cells are highlighted as a common cell when outputted or displayed.

28. A navigation apparatus as set forth in claim 1, wherein a cell around a destination, a cell in which a destination falls, a cell near a destination, a cell contiguous with a blank surrounding these cells, are defined as cells relating to a destination; a cell around a current position, a cell in which a current position falls, a cell near a current position, a cell contiguous with a blank surrounding these cells, are defined as cells relating to a current position; and matching cells are computed or retrieved and outputted or displayed as a common cell when a cell relating a destination and a cell relating to a current position match.

29. A navigation apparatus as set forth in claim 28, wherein the common cells are highlighted when there are two or more common cells when outputted or displayed.

30. A navigation apparatus as set forth in claim 29, wherein when there are two or more common cells and the common cells are contiguous with the blank in common, the blank is defined as a common blank and the common cells sharing the common blank are highlighted when outputted or displayed.

31. A navigation apparatus as set forth in claim 30, wherein when there are two or more common blanks, the common cells sharing the common blanks are highlighted when outputted or displayed.

32. A navigation apparatus as set forth in claim 1, wherein a speed and direction of movement of the moving object are outputted or displayed by a vector along with the display of the cell.

33. A navigation apparatus as set forth in claim 1, wherein an ideal vector having of a speed and vector of the moving object enabling said cell to be avoided is computed and outputted or displayed along with the display of the cell.

34. A navigation method comprising:
  inputting different information relating to travel according to a type of moving object;
  generating the formation relating to a state of movement of the moving object and according to the type of the moving object; and,
  outputting or displaying said information, wherein said method computes or retrieves a unit area not suitable for travel as a cell and outputs or displays the same and the cell is computed and retrieved corresponding to the type of the moving object, wherein the cells, including units which are not suitable for travel are regarded as significant and displayed so as to create an area which is suitable for travel according to the type of moving object.

35. A navigation method as set forth in claim 34, further comprising highlighting a common cell a cell relating to a destination when outputted or displayed, a cell overlaying a line segment connecting a current position and destination, and a cell contiguous with a blank having a course from the current position to a destination when they match with the cell relating to the current position.

36. A navigation apparatus for mounting in a moving object, the navigation apparatus comprising:
  an input unit, a central processing unit, a storage unit, and an output unit, wherein said storage unit has a means for storing data relating to a navigated area, said input unit having means for inputting different information relating to travel, when said moving object is traveling, said central processing unit having computing and retrieving means for finding from data stored in said storage unit, a unit area not suitable for travel as a cell when said information relating to travel is inputted, and said output unit having means for outputting or displaying said cell, wherein the cells, including units which are not suitable for travel are regarded as significant and displayed so as to create an area which is suitable for travel of the moving object.

37. A navigation apparatus as set forth in claim 36, wherein said central processing unit further includes means for finding a cell located in a certain range of the navigated area when information relating to said range is input from said input unit and said output unit has a means for outputting or displaying said range and a cell located in said range.

38. A navigation apparatus as set forth in claim 36, wherein said central processing unit further includes means for finding a cell around a destination when information relating to said destination is input from said input unit and said output unit has a means for outputting or displaying said cell around said destination.

39. A navigation apparatus as set forth in claim 36, wherein said central processing unit further includes means for finding a cell in which a destination falls when information relating to said destination is input from said input unit and said output unit has a means for outputting or displaying said cell in which said destination falls.

40. A navigation apparatus as set forth in claim 36, wherein said central processing unit further includes means for finding a cell near a destination when information relating to said destination is input from said input unit and said output unit has a means for outputting or displaying said cell near said destination.

41. A navigation apparatus as set forth in claim 36, wherein said central processing unit further includes means for finding a cell around a current position when information relating to said current position is input from said input unit and said output unit has a means for outputting or displaying said cell around said current position.

42. A navigation apparatus as set forth in claim 36, wherein said central processing unit further includes means for finding a cell in which a current position falls when information relating to said current position is input from said input unit and said output unit has a means for outputting or displaying said cell in which a current position falls.

43. A navigation apparatus as set forth in claim 42, wherein a cell contiguous with a blank closest to a destination is computed or retrieved and outputted or displayed when outputting or displaying an expandable blank and a cell surrounded by said expandable blank.

44. A navigation apparatus as set forth in claim 43, wherein the cell positioned in a side area is the same as a cell in which a destination falls in the cells contiguous with the blank closest to the destination is computed or retrieved and outputted or displayed.

45. A navigation apparatus as set forth in claim 42, wherein a cell contiguous with a blank closest to a current position is computed or retrieved and outputted or displayed when outputting or displaying a blank including an expandable blank and a cell surrounded by said blank together.

46. A navigation apparatus as set forth in claim 36, wherein said central processing unit further includes means for finding a cell near a current position when information relating to said current position is input from said input unit and said output unit has a means for outputting or displaying said cell near a current position.

47. A navigation apparatus as set forth in claim 46, wherein a cell contiguous with a blank in which a current position is located is computed or retrieved and outputted or displayed when outputting or displaying a blank including an expandable blank and a cell surrounded by said blank together.

48. A navigation apparatus as set forth in claim 47, wherein, when travel is restricted to one of a right side and a left side of the cell contiguous with the blank, the cell contiguous with a right side of the blank is computed or retrieved and outputted or displayed when it is restricted to the right side and similarly the cell contiguous with the left side of the blank is computed or retrieved and outputted or displayed when it is restricted to the left side.

49. A navigation apparatus as set forth in claim 36, wherein a cell around a destination and a cell in which a destination falls are computed or retrieved together, and said cell in which a destination falls is highlighted when outputted or displayed.

50. A navigation apparatus as set forth in claim 36, wherein a cell around a destination and a cell near a destination are computed or retrieved together, and said cell near a destination falls is highlighted when outputted or displayed.

51. A navigation apparatus as set forth in claim 36, wherein a cell around a current position and a cell in which a current position falls are computed or retrieved together, and said cell in which a current position falls is highlighted when outputted or displayed.

52. A navigation apparatus as set forth in claim 36, wherein a cell around a current position and a cell near a current position are computed or retrieved together, and said cell near a current position is highlighted when outputted or displayed.

53. A navigation apparatus as set forth in claim 36, wherein the area having suitability for the travel of the moving object is defined as a blank and said blank is outputted or displayed along with the output or display of a cell surrounded by said blank.

54. A navigation apparatus as set forth in claim 36, wherein a cell contiguous with a blank is computed or retrieved and outputted or displayed when outputting or displaying a blank and a cell surrounded by said blank.

55. A navigation apparatus as set forth in claim 36, wherein an expandable blank having expandability is outputted or displayed along with the output or display of a cell surrounded by the expandable blank when the blank is an expandable blank.

56. A navigation apparatus as set forth in claim 36, wherein a cell contiguous with an expandable blank is computed or retrieved and outputted or displayed when outputting or displaying an expandable blank and a cell surrounded by said expandable blank.

57. A navigation apparatus as set forth in claim 36, wherein a cell contiguous with a blank in which a destination is located is computed or retrieved and outputted or displayed when outputting or displaying a blank including an expandable blank and a cell surrounded by said blank together.

58. A navigation apparatus as set forth in claim 36, wherein a line segment connecting a destination and a current position is found and the cell overlaying the line is computed or retrieved and outputted or displayed when information relating to a destination and information relating to a current position are input by said input unit.

59. A navigation apparatus as set forth in claim 58, wherein when the cell overlaying the line segment and the cell relating to the current position match, the matching cells are highlighted as a common cell when outputted or displayed.

60. A navigation apparatus as set forth in claim 36, wherein a course from a current position to a destination is found and a cell contiguous with a blank having said course is computed or retrieved and outputted or displayed when information relating to the destination and information relating to the current position are input by said input unit.

61. A navigation apparatus as set forth in claim 60, wherein, when travel, is restricted to one of a right side and a left side of the cell contiguous with the blank, the cell contiguous with the right side of the blank having said course is computed or retrieved and outputted or displayed when it is restricted to the right side and similarly the cell contiguous with the left side of the blank is computed or retrieved and outputted or displayed when it is restricted to the left side.

62. A navigation apparatus as set forth in claim 60, wherein when the cell contiguous with the blank includes a course and the cell relating to the current position match, the matching cells are highlighted as a common cell when outputted or displayed.

63. A navigation apparatus as set forth in claim 36, wherein a cell around a destination, a cell in which a destination falls, a cell near a destination, a cell contiguous with a blank surrounding these cells, are defined as cells relating to a destination; a cell around a current position, a cell in which a current position falls, a cell near a current position, a cell contiguous with a blank surrounding these cells, are defined as cells relating to a current position; and matching cells are computed or retrieved and outputted or displayed as a common cell when a cell relating a destination and a cell relating to a current position match.

64. A navigation apparatus as set forth in claim 63, wherein the common cells are highlighted when there are two or more common cells when outputted or displayed.

65. A navigation apparatus as set forth in claim 64, wherein when there are two or more common cells and the common cells are contiguous with the blank in common, the blank is defined as a common blank and the common cells sharing the common blank are highlighted when outputted or displayed.

66. A navigation apparatus as set forth in claim 65, wherein when there are two or more common blanks, the common cells sharing the common blanks are highlighted when outputted or displayed.

67. A navigation apparatus as set forth in claim 36, wherein a speed and direction of movement of the moving object are outputted or displayed by a vector along with the display of the cell.

68. A navigation apparatus as set forth in claim 36, wherein an ideal vector having of a speed and vector of the moving object enabling said cell to be avoided is computed and outputted or displayed along with the display of the cell.

* * * * *